United States Patent

[11] 3,614,250

| [72] | Inventors | Walter L. Connolly<br>Orinda;<br>Harold C. Andree, Orinda; Ralph M.<br>Harrison, Oakland, all of Calif. |
|---|---|---|
| [21] | Appl. No. | 834,658 |
| [22] | Filed | June 19, 1969 |
| [45] | Patented | Oct. 19, 1971 |
| [73] | Assignee | Grove Valve and Regulator Company<br>Oakland, Calif. |

[54] AUTOMATIC MACHINE TOOL
9 Claims, 3 Drawing Figs.

[52] U.S. Cl. ................................................. 408/3,
408/147
[51] Int. Cl. ....................................... B23b 39/26,
B23b 47/18
[50] Field of Search ........................................ 77/2 C, 1, 3
C, 2, 4 C, 4, 58.35, 58, 58 C

[56] References Cited
UNITED STATES PATENTS
| 2,814,964 | 12/1957 | Werth ........................... | 77/3 C |
| 3,113,475 | 12/1963 | Lombardo ..................... | 82/1.4 |

*Primary Examiner*—Francis S. Husar
*Attorney*—Melvin R. Stidham

ABSTRACT: An automatic tool for machining interior surfaces of stationary work. A hollow shaft is rotated and moved axially, and a cutting member carried on a radial slide on one end of the shaft is moved by a push rod through an axial to radial motion transmitting device to vary the diameter of the bore. Axial movements of the push rod and shaft are delivered by input cylinders, the piston of which are connected to output sensing pistons which operate slave piston drive slides, indicating motion along two axes.

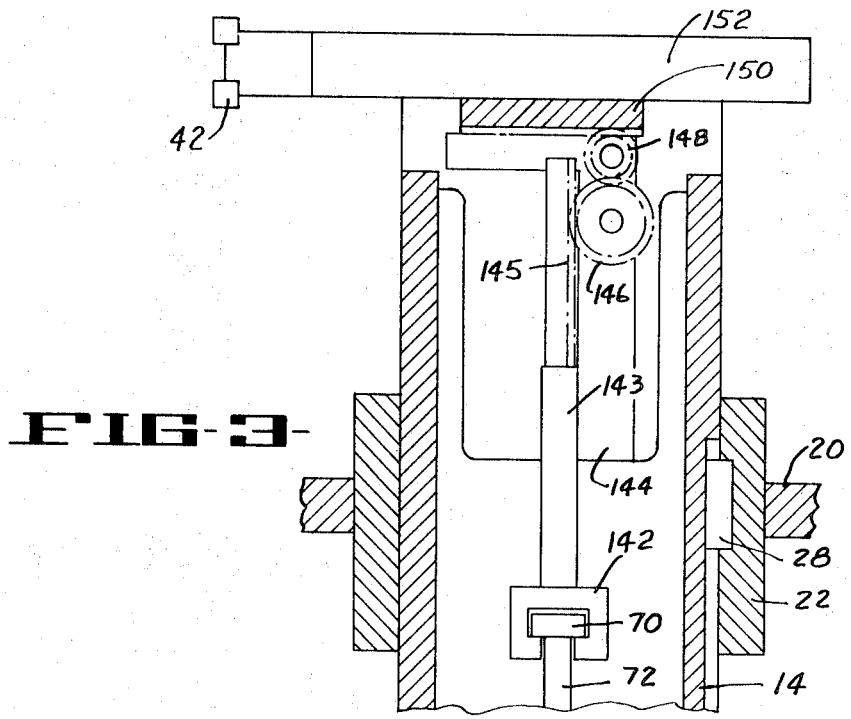
FIG-3-
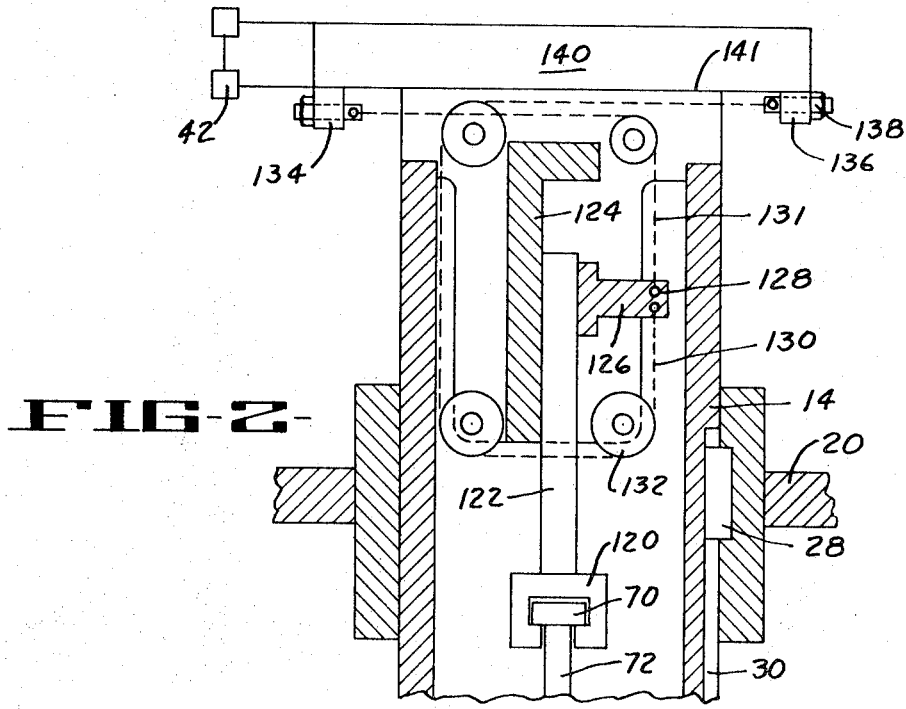
FIG-2-

AUTOMATIC MACHINE TOOL

BACKGROUND OF THE INVENTION

This invention relates to an automatic machine tool and, particularly, to an automatic machine tool having a cutter member which may be moved both radially and axially while being rotated.

In conventional machine tools, the work is rotated while a cutting member is moved selectively, radially and axially with respect to the axis of rotation. However, particularly when working on a massive article, such as a heavy valve body requiring finely finished interior surfaces, it is highly desirable to rotate the tool, rather than the work. However, in the case of existing machine tools, there are strict limitations upon the movements through which the tool may be directed as it rotates. For example, many rotating tools, such as drills, may be moved axially, but not radially. When finishing interior surfaces, the tool is further restricted by the confines within which it must be operated.

It is, therefore, an object of this invention to provide a machine tool including a cutting member which may be rotated rapidly, and while so rotating, may be moved both axially and radially to form a desired profile of varying bore diameter about the axis of rotation.

It is a further object of this invention to provide a machine tool having a cutting member which may be moved radially in response to an input movement delivered axially of the shaft.

It is a further object of this invention to provide a machine tool which is rotated and moves both axially and radially by pressure fluid operated pistons which are moved parallel to the axis of the shaft and including slave pistons which are moved in response to movements of the driving pistons to indicate delivery of the desired tool movements.

It is a further object of this invention to provide a machine tool which may be rotated and driven both radially and axially by hydraulic means and including perpendicularly disposed slides driven in response to axial and radial movement of the tool, respectively, to indicate actual tool movements.

It is a further object of this invention to provide a cutting tool which is moved both axially and radially by hydraulic means and including a control valve which is moved in two perpendicular axes along a template in response to movement of the tool whereby operation of the hydraulic means is revised after completion of a desired tool movement.

Other objects and advantages of this invention will become apparent from a detailed description herein when read in conjunction with the accompanying drawing.

SUMMARY OF THE INVENTION

In carrying out this invention, there is provided a cutting member which is carried on a radial slide at one end of a rotating shaft. The slide is moved by connection to an axial to radial motion transmitting system. For example, the slide may be connected to a radially disposed piston which, in turn, is driven by transmission of a pressure fluid by a transmitter piston movable within, and along the axis of the shaft. Hence, movement of the transmitter piston in one direction along the axis of the shaft forces fluid at one end of the transmitter piston to drive the cutting tool radially outward while movement of the transmitter piston in the opposite direction drives the cutting tool radially inward. The transmitter piston is operated by a rotatable connection with the piston rod of an input cylinder. The shaft is rotated in a frame member and driven through a gear train which includes a gear slidably carried around the shaft so that the shaft may be moved axially as it is being rotated. The end of the shaft opposite from that on which the cutting tool is mounted, is rotated on a carriage which, in turn, is moved axially by a hydraulically operated piston.

The piston rods which produce the axial movements of the shaft and the radial movements of the cutting member slide are connected to the piston rods of output sensing cylinders which transmit fluid to slave cylinders at the operator station. One slave cylinder drives a vertically movable main slide, and a second slave cylinder is carried on the main slide to drive a horizontal subslide which carries the control valve for the main motion input cylinders. A movable operator operates the valve under control of a fixed template to deliver fluid to one or both of the input cylinders, and movements of the input pistons, in turn, produce corresponding movements of the slave pistons so that completion of a desired movement changes the setting of the valve operator and, hence the operation of the input pistons. In other embodiments of the invention, mechanical motion transmitting devices are providing for translating axial movement of a push rod into radial movement of the cutting member.

BRIEF DESCRIPTION OF THE DRAWING

FIGS. 2 and 3 are schematic illustrations of alternative embodiments utilizing a mechanical motion transmitting system for one of the drives.

DESCRIPTION OF THE PREFERRED EMBODIMENTS

The Embodiment of FIG. 1

Figure 1:
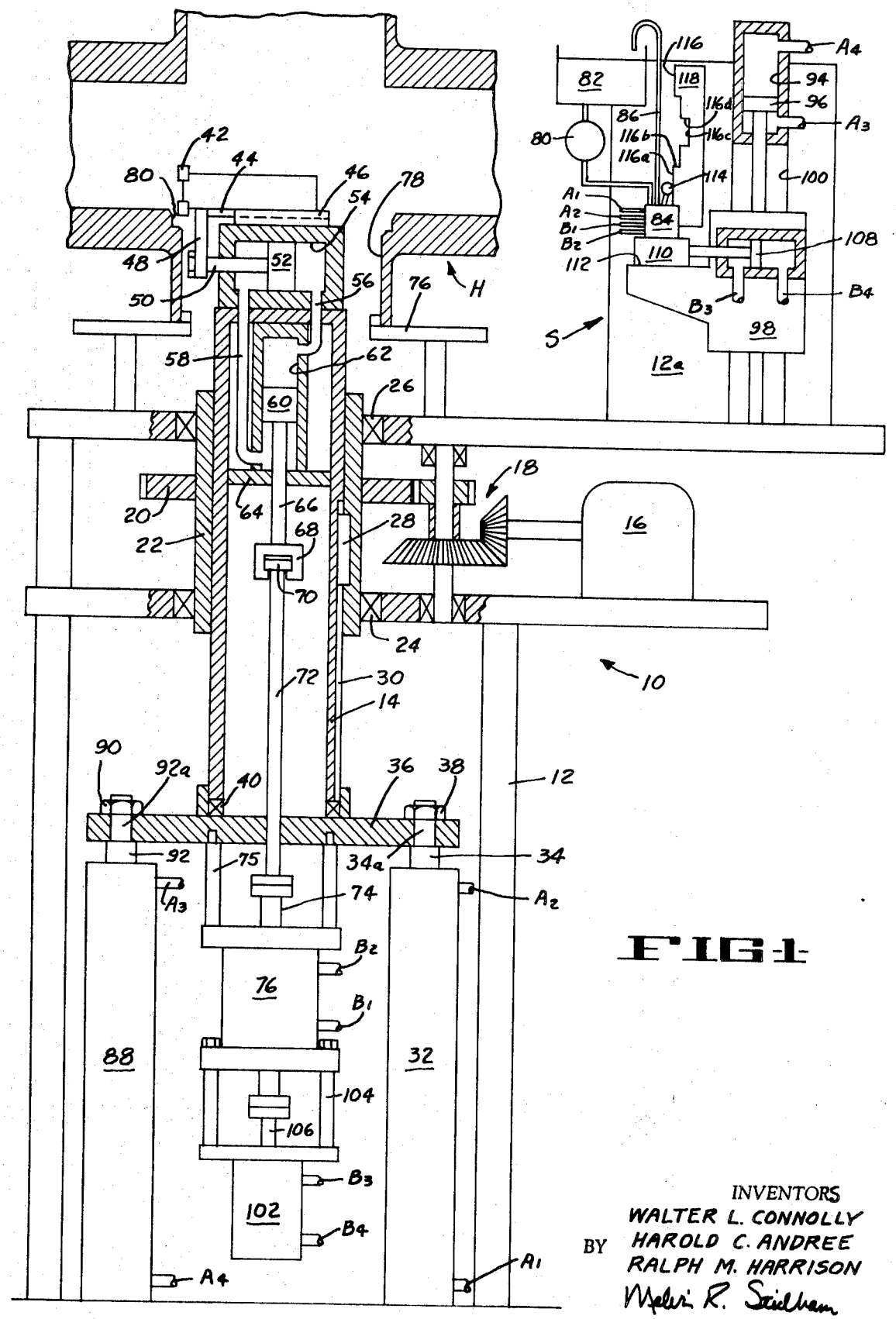
FIG. 1 is a more or less schematic drawing illustrating an automatic machine tool with hydraulic system arranged in accordance with this invention.

Referring now to FIG. 1 of the drawing with greater particularity, the automatic boring machine 10 of this invention may include a supporting structure or frame 12 in which is rotatably carried a hollow main shaft 14. The hollow shaft 14 is rotated from any suitable power source, such as the motor 16 through a drive train 18 which rotates a gear 20 fixed around a sleeve 22. The sleeve 22 is rotatably carried in the bearings 24 and 26 to drive the shaft 14 by means of a longitudinally slidable engagement of a key 28 on the sleeve along a keyway 30 on the shaft to permit axial movement of the shaft within and along the sleeve 22 even as the shaft is being rotated. The axial movement of the shaft 14 may be produced by means of a hydraulic cylinder 32 the piston rod of which is secured to a carriage 36 as by means of a nut 38, threaded on the reduced end portion 34a thereof. The shaft 14 is rotatably supported on the carriage 36, as by means of the bearings 40.

The boring machine of this invention 10 is capable of cutting a bore of varying diameters, and this is accomplished by mounting the cutting tool 42 on a radial slide 44 carried in a slideway 46 mounted at the upper end of the rotating shaft 14. The slide is moved radially in or out by connection to a radial motion transmitting device. In the embodiment of FIG. 1, a depending arm 48 is connected to a piston rod 50 of a piston 52 slidably carried in a radial cylinder 54. Hence, transmission of fluid through the duct 56 at the right-hand side of the cylinder 54 in FIG. 1 would drive the tool slide 44 radially outward while introduction of fluid to the duct 58 at the opposite end will retract the cutting tool 42 for a smaller diameter bore. The pressure fluid is transmitted selectively through the ducts 56 and 58, dependent upon movement of a transmitter piston 60 which is slidable up or down within a coaxial transmitter cylinder 62 secured within the rotating shaft 14, as by bolting a support member 64 to the shaft 14. At the lower end of the transmitter piston rod 66, there is provided some suitable means, such as a receptacle 68 for providing a rotary coupling with the head 70 of a pusher rod 72 which, in turn, is secured to the upper end of a piston rod 74 in a double acting cylinder 76, which is supported on the carriage 36 by means of a tie rod 75 or the like so as to move therewith. Hence, movement of the piston rod 74 either up or down by introduction of pressure fluid as hereinafter described through either of the ducts $B_1$ or $B_2$ will move the transmitter piston 60 up or down while permitting the transmitter piston to rotate with the shaft 14 within which it is carried.

It will be readily apparent from the foregoing description that the cutting tool may be rotatably driven to bore the interior of, for example, a valve housing H supported at 76 on the frame 12. As the cutting tool 42 is rotated, it is moved both axially and radially in accordance with the bore profile desired. For example, it may make a single diameter constant bore to finish the inner surface 78 of the valve hub and then move outward and upward to cut an annular seat ring recess 80. The axial movements are delivered by means of the first hydraulic input cylinder 32 and the radial movements are produced by means of the second hydraulic input cylinder 76 through the transmitter piston 60 which drives the fluid to push the driving piston 52 and move the slide 44 radially inward or outward.

The operation of the automatic boring machine to form the desired bore profile may be controlled at a remote operator station by means now to be described. Hydraulic fluid or other pressure fluid is driven as by a pump 80 from a suitable source, such as a sump 82 to a control valve 84 which controls operation of the input cylinders 32 and 76. Hence, opening the line $A_1$ to the pump 80 and the line $A_2$ to the return line 86 will force the axial input piston rod 34 up to raise the rotating shaft 14, and the cutting tool and the reverse operation is effected when lines $A_1$ and $A_2$ are opened to the return line 86 and the pump 80, respectively, Similarly, when line $B_1$ is opened to the pump 80 and line $B_2$ to the return line 86, the radial drive input piston rod 74 is raised to force the transmitter piston 60 up and the driving piston 52 out, so as to increase the diameter of the bore. By reversing the setting and opening the line $B_2$ to the pump 80, the cutting tool is withdrawn for a smaller bore.

This system also contemplates the visual indication that a given operation is being performed, as well as automatic adjustment of the hydraulic systems as the operation progresses. For this purpose an axial output sensing hydraulic cylinder 88 is secured to the axial feed carriage 36 as by threading a nut 90 on the reduced end 92a of the piston rod 92 effectively trying the input piston rod 34 and the output sensing piston rod 92 together. Hence, when the input piston is raised, the output sensing piston rod will similarly be raised to force fluids out through the upper outlet duct $A_3$, and when the input piston is lowered the output sensing piston will drive fluid out the lower duct $A_4$. The ducts $A_3$ and $A_4$ are connected respectively to the bottom and top of a slave cylinder 94 at a remote operation station S so that the raising of the output sensing piston will force the slave piston 96 upward to raise a slide 98 along a slideway 100 on a subframe 12a.

Similarly, a radial output sending cylinder 102 is secured to the input cylinder 76 as by means of a tie bolt 104 also to move with the carriage 36, and the piston rods 74 and 106 are likewise coupled so that movement of the input piston rod 74 will be transmitted directly to the output sensing piston rod 106. Hence, when the input piston is raised, the output sensing piston will also be raised to force fluid out through the ducts $B_3$, and lowering of the input piston will cause the output sensing piston to force fluid out through the lower ducts $B_4$. Fluid pressure delivered through duct $B_3$ will cause the radial feed slave piston 108 to be forced to the right in FIG. 1, and this will move a subslide 110 along a slideway 112 on the main slide 98. Similarly, delivery of the fluid through the duct $B_4$ will move the piston 108 and the slide 110 to the left. Of course, in either case, fluid on the opposite side of the piston is forced back through the connecting duct to the output sensing cylinder. While we have shown closed hydraulic systems between corresponding ends of the output sensing device and slave cylinders, it may be advisable to include a reservoir with parallel lines for check and relief valve to insure a full system even though the pistons come out of phase. The control valve is carried on the subslide 110 so that movements of the main slide 98 and subslide 110 will produce movements of the control valve, the operator of which 114 moves along the profile 116 of a template 118 designed to indicate the profile of the bore being cut.

In operation, the machine operator moves the valve manually to a position wherein it will produce axial and/or radial movement of the tool as needed to drive input piston rods 34 and 74 to the desired starting point. This in turn moves output sensing rods 92 and 106 in a corresponding direction to pressurize the slave ducts and move the slide 110 vertically and/or laterally until the valve operator 114 engages the first template profile 116a. Then, it traverses the first portion of the profile 116a with the valve in a position to pressurize duct $A_1$ and shutoff ducts $B_1$ and $B_2$ holding the radial feed piston 52 steady while the axial feed piston rod rises carrying the shaft and the cutting tool up through the valve hub portion 78. As the carriage 36 is moved upwardly it forces the output sensing piston rod 92 upward to drive the axial slave piston 96 and the main slide 98 up so that the valve operator 114 is moved along the profile 116a of the template then, when the first step 116b is reached, the valve control is released, and this moves the valve to position wherein the duct $B_1$ is opened to the pump 80 and the ducts $A_1$ and $A_2$ are shut off. This forces the transmitter piston 60 up and forces transmission of fluid through the duct 56, causing the piston 52 and the cutter slide 44 to move radially outward as, for example, to form an annular recess 80 for a valve seat ring. When the next step 116c is is reached, the valve is again moved into position wherein the duct $A_1$ is opened to the pressure fluid, and the axial input piston rod 34 is again elevated to commence a constant bore cut. When an inward step 116d of the template is reached, the valve is moved to opposite position wherein the duct $B_2$ is opened to the pump, drawing the cutting tool 42 radially inward for a smaller diameter bore. It will be apparent that bores of varying profiles, including chamfers, may be cut simply guiding along the template so that one or both of the cylinders are activated to move the cutting tool 42 axially, radially or diagonally.

The Embodiment of FIG. 2

In the embodiment of FIG. 2, a receptacle 120 at the lower end of a slide member 122 rotatably receives the upper end of the push rod 72. The slide member 122 is movable along a slideway 124, which is mounted in the hollow shaft 14, and carries a cable pull 126 to which is secured at 128 the corresponding ends of a pair of chains or cables 130, 131. The cables 130, 131 are, in turn, extended over a series of pulleys 132 and have their opposite ends secured at 134, 136 to the opposite ends of the cutting member 140 carried in a slideway 141. Hence, as the slide 122 moves axially up or down, it causes the cables 130, 131 to pull the members 134, 136 and, hence, the slide 140 in the appropriate radial direction. Suitable adjustment means 138 are preferably provided to take up any slack in the cable and to adjust the timing of the device.

The embodiment of FIG. 3

In the embodiment of FIG. 3, a receptacle 142 at the lower end of a slide member 143 is movable along a slideway 144 and carries a rack 145 to move with it. The rack meshes with a piston 146 to drive a second pinion 148. The second piston 148 drives a rack 150 which is secured to the cutting member slide 152. Hence, it is apparent that vertical movement of the pusher rod 72, produces horizontal movement of the rack 150 and, with it the slide 152.

While this invention has been described in conjunction with preferred embodiment thereof, it is obvious that modifications and changes therein may be made without departing from the spirit and scope of this invention.

What is claimed is:
1. A machine tool including:
   a frame member,
   a shaft rotatably carried on said frame member,
   a slide mounted on said shaft for movement radially thereof,
   a cutting member carried on said slide engageable with work piece,
   a first input cylinder, and
   a first input piston in said first cylinder rotatably connected to one end of said shaft for moving said shaft axially,
   a second pressure fluid input cylinder,
   a second input piston in said second cylinder coaxial with said shaft, and an axial to radial motion transmitting device rotatably connected to said second input piston and drivingly connected to said slide.

2. The machine tool defined by claim 1 including:
a first output sensing piston in said cylinder connected to said first input piston so that movements of said first input piston are transmitted to said first output sensing piston, and
axial movement indicator means for indicating movements of said first output sensing piston.

3. The machine tool defined by claim 2 including:
a first slave cylinder located at an operator station displaced from said first output sensing piston,
a first slave piston in said cylinder operating said axial movement indicator means, and
first slave duct means connecting the ends of said first output sensing and slave cylinders so that movements of the first output sensing piston are transmitted to the first slave piston.

4. The machine tool defined by claim 3 including:
a first racer slide member slidably mounted at said operator station and connected to said first slave piston,
a valve on said first tracer slide member for connecting said first input cylinder to a source of pressure fluid,
a valve operating member, and
a template on said frame member engageable by said valve operating member to operate said valve in response to movements of said first tracer slide.

5. The machine tool defined by claim 1 wherein said motion transmitting device comprises:
a radial pressure fluid driving cylinder mounted on said shaft with the axis thereof disposed radially of said shaft,
a radial driving piston in said cylinder connected to said slide,
a pressure fluid transmitter cylinder on said shaft disposed coaxially therewith,
a transmitter piston in said transmitter cylinder,
transmitter duct means connecting the ends of said transmitter and radial driving cylinders so that movements of said transmitter piston produce corresponding movements of said driving piston, and
means for moving said transmitter piston axially of said shaft.

6. The machine tool defined by claim 2 including:
a second output sensing cylinder
a second output sensing piston connected to said second input piston so that movements of said second input piston are transmitted to said second output sensing piston, and
radial movement indicator means for indicating movements of said second output sensing piston.

7. The machine tool defined by claim 6 including:
a slave cylinder located at an operator station displaced from said second output sensing cylinder,
a complementary save piston in said cylinder operating said radial movement indicator means, and
slave duct means connecting the ends of said second output sensing cylinder and said slave cylinder so that movements of the second output sensing piston are transmitted to said complementary slave piston.

8. The machine tool defined by claim 7 including:
a tracer slide member slidably mounted at said operator station and connected to said complementary slave piston,
a valve on said tracer slide member for connecting said second input cylinder to a source of pressure fluid,
a valve operating member on said valve, and
a template on said frame member engageable by said valve operating member to operate said valve in response to movements of said tracer slide member.

9. The machine tool defined by claim 1 including:
a first output sensing cylinder,
a first output piston in said cylinder connected to said first input piston so that movements of said first input piston are transmitted to said first output piston,
a radial pressure fluid driving cylinder mounted on said shaft with the axis thereof disposed radially of said shaft,
and means for moving said slide radially comprising:
a push rod disposed coaxially within said shaft,
second input cylinder for moving said push rod, axially of said shaft,
an axial to radial motion transmitting device rotatably connected to said push rod and connected to drive said slide,
a second output sensing cylinder mounted on said shaft to move axially therewith,
a second output piston in said cylinder connected to said push rod so that movements of said push rod are transmitted to said second output piston,
and including:
first and second slave cylinders located at an operator station displaced from said first and second output sensing cylinders,
first and second slave pistons in said cylinders,
first and second slave duct means connecting the ends of said output cylinders and said slave cylinders so that movements of the first and second output sensing pistons are transmitted to the first and second slave pistons respectively,
a first tracer slide member slidably mounted at said operator station and connected to said first slave piston,
a second tracer slide member slidably mounted on said first tracer slide member for movement transverse thereto and connected to said second slave piston,
a valve on said second tracer slide member for connecting said first and second input cylinders to a source of pressure fluid,
a valve operating member on said valve, and
a template on said frame member engageable by said valve operating member to operate said valve in response to movements of said first and second tracer slides.